United States Patent
Ghosh et al.

(10) Patent No.: US 9,524,089 B1
(45) Date of Patent: Dec. 20, 2016

(54) COMMON WEB COMPONENT

(71) Applicant: Amazon Technologies, Inc., Seattle, WA (US)

(72) Inventors: Sanjoy Ghosh, Sunnyvale, CA (US); Mayur Misra, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 224 days.

(21) Appl. No.: 14/528,472

(22) Filed: Oct. 30, 2014

(51) Int. Cl.
*G06F 3/00* (2006.01)
*G06F 3/0484* (2013.01)
*H04L 29/08* (2006.01)

(52) U.S. Cl.
CPC ........... *G06F 3/04842* (2013.01); *H04L 67/02* (2013.01)

(58) Field of Classification Search
CPC .................................................. G06F 3/04842
USPC ........................................................ 715/738
See application file for complete search history.

(56) References Cited

U.S. PATENT DOCUMENTS

| | | | | |
|---|---|---|---|---|
| 8,150,914 B1* | 4/2012 | Taneja | ................... | H04L 67/06 709/203 |
| 8,788,935 B1* | 7/2014 | Hirsch | ................ | G06F 17/2247 715/234 |
| 9,053,299 B2* | 6/2015 | Wieder | ................ | H04L 67/306 |
| 2004/0240642 A1* | 12/2004 | Crandell | ............... | H04M 7/128 379/88.22 |
| 2011/0010778 A1* | 1/2011 | Risan | ...................... | G06F 21/10 726/30 |
| 2011/0093515 A1* | 4/2011 | Albanese | ............... | G06Q 30/02 707/812 |
| 2012/0110515 A1* | 5/2012 | Abramoff | ......... | G06F 17/30994 715/854 |
| 2012/0226738 A1* | 9/2012 | Taneja | .................... | H04L 67/34 709/203 |
| 2013/0268490 A1* | 10/2013 | Keebler | ............ | G06F 17/30575 707/627 |
| 2014/0344332 A1* | 11/2014 | Giebler | ............... | H04L 67/2823 709/203 |

OTHER PUBLICATIONS

Author Unknown, "Application Fundamentals—Android Developers," Available at http://developer.android.com/guide/components/fundamentals.html, 7 pages (printed Sep. 3, 2014).
Author Unknown, "Bound Services—Android Developers," Available at http://developer.android.com/guidelcornponentslbound-services.html, 12 pages (printed Sep. 3, 2014).

(Continued)

*Primary Examiner* — William Titcomb
(74) *Attorney, Agent, or Firm* — K&L Gates LLP

(57) ABSTRACT

Various embodiments are directed to systems and methods for executing web applications. A computing device may execute a common view process that comprises a web view. The computing device may receive a request to launch a web application. The computing device may execute a web application interface process programmed to determine a location indicator indicating a location of code for executing the web application and send the location indicator to the web view. The web view may receive the code for executing the web application. The code may be executed by the web view.

20 Claims, 10 Drawing Sheets

(56) References Cited

OTHER PUBLICATIONS

Author Unknown, "Building Web Apps in WebView—Android Developers," Available at http://developer.android.com/guide/webappslwebview.html, 6 pages (printed Sep. 3, 2014).
Author Unknown, "The Chromium Projects—Third Party Developmers," Available at http://www.chromium.org/Home/third-party-developers, 3 pages (printed Sep. 3, 2014).
Author Unknown, "WebView—Android Developers," Available at http://developer.android.com/reference/android/webkit/WebView.html, 35 pages (printed Sep. 3, 2014).

* cited by examiner

COMMON WEB COMPONENT

BACKGROUND

Many modern computing devices utilize web applications that are executable across multiple platforms. For example, web applications written in JavaScript or another scripting language are executable through a web browser or other web-enabled system component. For client-side web applications, the web-enabled component downloads the web application from a remote server and executes the downloaded application within the web-enabled component. For example, interaction between the web application and native hardware and software of the computing device is handled by the web-enabled component. Web applications are used to provide users with many different functionalities including, for example, shopping, gaming, etc.

When a user attempts to launch a web application on a computing device, the device determines whether a suitable web-enabled component, for example a web browser or web view, is executing. If not, the computing device first launches a web-enabled component and then uses the web-enabled component to download and execute the web application. Web-enabled components are often "heavyweight" software components that utilize significant amounts of memory, buffers and other system resources. For this reason, they can take an extended period of time to launch and initialize. If a web-enabled component is not already running when the web application is launched, this can result in noticeable and undesirable launch delays.

DETAILED DESCRIPTION

In the following description, reference is made to the accompanying drawings which illustrate several embodiments of the present invention. It is understood that other embodiments may be utilized and various operational changes may be made without departing from the spirit and scope of the present disclosure. The following detailed description is not to be taken in a limiting sense, and the scope of the embodiments of the present invention is defined only by the claims of the issued patent.

Figure 1:
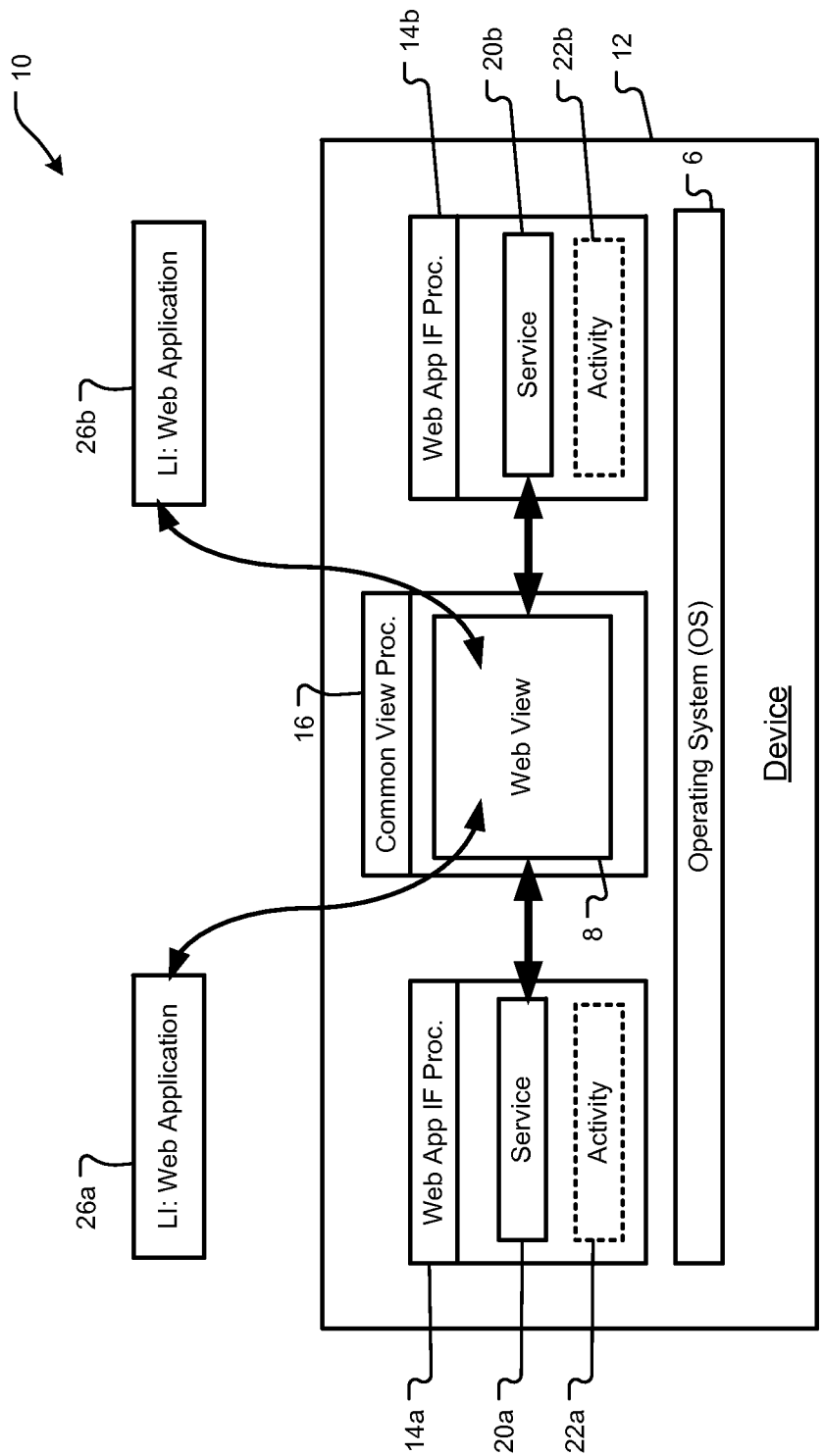
FIG. 1 is diagram showing one embodiment of an environment including a computing device configured to utilize a common view process.

Systems and methods in accordance with the embodiments described herein may utilize a common view process to provide a web view for executing web applications launched from other processes. FIG. 1 is diagram showing one embodiment of an environment 10 including a computing device 12 configured to utilize a common view process 16. The computing device 12 may execute the common view process 16 and one or more web application interface processes 14a, 14b. Execution of the various processes may be managed by an operating system 6. Any suitable operating system 6 may be used including, for example, ANDROID, available from GOOGLE, the FIRE OS available on devices from AMAZON.COM, INC., IOS available from APPLE, INC., WINDOWS PHONE available from MICROSOFT CORPORATION, etc. Although these examples are mobile operating systems, in some examples, the computing device 12 may execute other operating systems including, for example, LINUX, various MICROSOFT WINDOWS operating systems available from MICROSOFT. OS X available from APPLE, INC., etc.

The common view process 16 comprises a web view object or web view 8. The web view 8 is a web-enabled component that is capable of downloading and displaying web content. The web view 8 may also be enabled to download and execute web applications 26a, 26b. In addition to the common view process 16, the computing device 12 may also execute one or more web application interface processes 14a, 14b. The web application interface processes 14a, 14b may comprise one or more service objects or services 20a, 20b. The services 20a, 20b, as described herein, may be programmed to initialize the launching of the web applications 26a, 26b. Launching a component may comprise beginning execution of the component when the component was not previously executing.

The services 20a, 20b may request that the web view 8 of the common view process 16 execute the web applications 26a, 26b. For example, the web application interface processes 14a, 14b may not include web view objects but may instead utilize the web view 8 of the common view process 16, for example, as described herein. In some examples, the web application interface processes 14 may comprise one or more activity objects or activities 22 for interacting with a user of the computing device 10. For example, the activity 22 may provide the user 56 (FIG. 2) with a user interface for receiving navigational controls allowing the user 56 to navigate among applications executed by the computing device 12.

In some examples, one or more of the services 20a, 20b is bound to the web view 8, for example, through the operating system 6. Services bound to another object may be referred to as bound services. When objects are bound to one another, the operating system 6 may manage the bound objects in a way that makes it more likely that the bound objects are active at the same time. For example, when the web view 8 is bound to the service 20a, the operating system 6 may manage the web view 8 and service 20a to make it more likely that both objects 8, 20a are active at the same time. In this way, if one of the bound objects (e.g., the web view 8) directs a communication to the other (e.g., the service 20a), the communication is often delivered without the need to first launch or re-activate the receiving object. The operating system 6 may increase the likelihood that bound objects are active at the same time in any suitable manner. For example, when an object is active, the operating system 6 may increase an activation priority of any other objects to which it is bound. When objects are unbound or not bound to one another, the operating system 6 may manage the activation state of the objects without regard to whether the unbound objects are active. This may increase the likelihood that the operating system 6 will receive communications directed to inactive objects. When the operating system 6 receives a communication directed to an inactive object, the communication may be delayed until the recipient object is activated to receive the communication. Services, such as 20a and 20b, may be bound to the web view 8 (or to the common view process 16) at any suitable time. For example, in some embodiments, a service 20a, 20b may be bound to when its web application interface process 14a, 14b is launched, for example, as part of a launch routine. Also, in some embodiments, a service may be bound to the appropriate components (such as the web view 8, or the common view process 16) at the time of the first communication between the components.

When a web application 26a, 26b is to be launched, the service 20a, 20b of the web application interface process 14a, 14b may determine a location of the web application 26a 26b to be launched. The location of a web application 26a, 26b (e.g., the location of code for executing the web application) may be organized using any suitable type of location indicator (indicated as LI in FIG. 1). For example, the location indicator may be and/or include an Internet Protocol (IP) address, a Universal Resource Locator (URL), etc. The location indicator is passed to the web view 8 which downloads and executes the web application 26a, 26b. In some examples, determining the location indicator may comprise incorporating at least one input parameter into the location indicator. Example input parameters include descriptors of the computing device 12 and descriptors of the user 56. Descriptors of the computing device 12 may comprise, for example, a device identification (ID), a serial number, etc. Descriptors of the user 56 may comprise, for example, a user ID, a country of residence, a preferred marketplace for digital works or other goods/services, etc. The input parameters may be used in any suitable manner. For example, the host 50, 52 may select a web application 54 to be provided to the computing device 12 based on input parameters indicated by the location indicator. Also, based on the input parameters, the host 50, 52 may modify a web application 54 before sending it to the computing device 12. Further, the input parameters may be used as input to the web application 54 when it executes at the computing device 12.

The service 20a, 20b may select input parameters in any suitable manner. For example, the service 20a, 20b may query a web application host 50, 52 (FIG. 2) hosting the web application 26a, 26b, or other host, to determine which input parameters are supported. The service 20a, 20b may subsequently retrieve values for the input parameters specific to the user 56, the computing device 12 and/or the context in which the web application 26a, 26b is to be launched. For example, when the web application provides a digital content store (e.g., 526a, 526b), the service (520a, 520b) may incorporate an indication of a selected digital work into the location indicator (FIG. 2).

In one example, the web application interface process 14a is to launch a web application 26a. The service 20a may determine the location of the web application 26a. The service 20a may pass the location indicator to the web view 8 in any suitable manner. For example, the service 20a may direct a request including the location indicator to the web view 8 via the operating system 6. The operating system 6 may receive the request from the service 20a and pass the message to the web view 8. When the service 20a is bound to the web view 8, the operating system 6 may maintain the web view 8 in an active state while the service 20a is active or increase an activation priority of the web view 8 to make it more likely that the web view 8 is active to receive the message. Accordingly, when a request to launch a web application is received from a web application interface process 14, the common view process 16 (and web view 8) may already be running. This may allow the web application 26a to be launched faster than if the device 12 were to launch a dedicated web view or other web-enabled component. Other web application interface processes, such at 14b, may operate in a similar manner to launch other web applications, such as 26b.

The common view process 16 and web view 8, in various examples, may be utilized by multiple web application interface processes 14a, 14b to execute multiple web applications 26a, 26b. The common view process 14 may execute more than one web application 26a, 26b sequentially or in parallel. For example, when the web applications 26a, 26b are executed sequentially, a single web view 8 may execute one web application 26a, 26b at a time. At an appropriate time, the web view 8 switches from one web application (e.g., 26a) to another web application (e.g., 26b). To switch web applications, the web view 8 may deactivate the currently active web application 26a, 26b and then activate a second web application 26a, 26b. Switches may occur upon the occurrence of any suitable event. For example, the web view 8 may switch between web applications 26a, 26b when a first application has completed or reached a pause in its processing. In some embodiments, the common view process 16 may execute multiple web applications 26a, 26b in parallel. For example, the common view process 16 may launch multiple web views 8 with each web view 8 executing a separate web application 26a, 26b.

Figure 2:
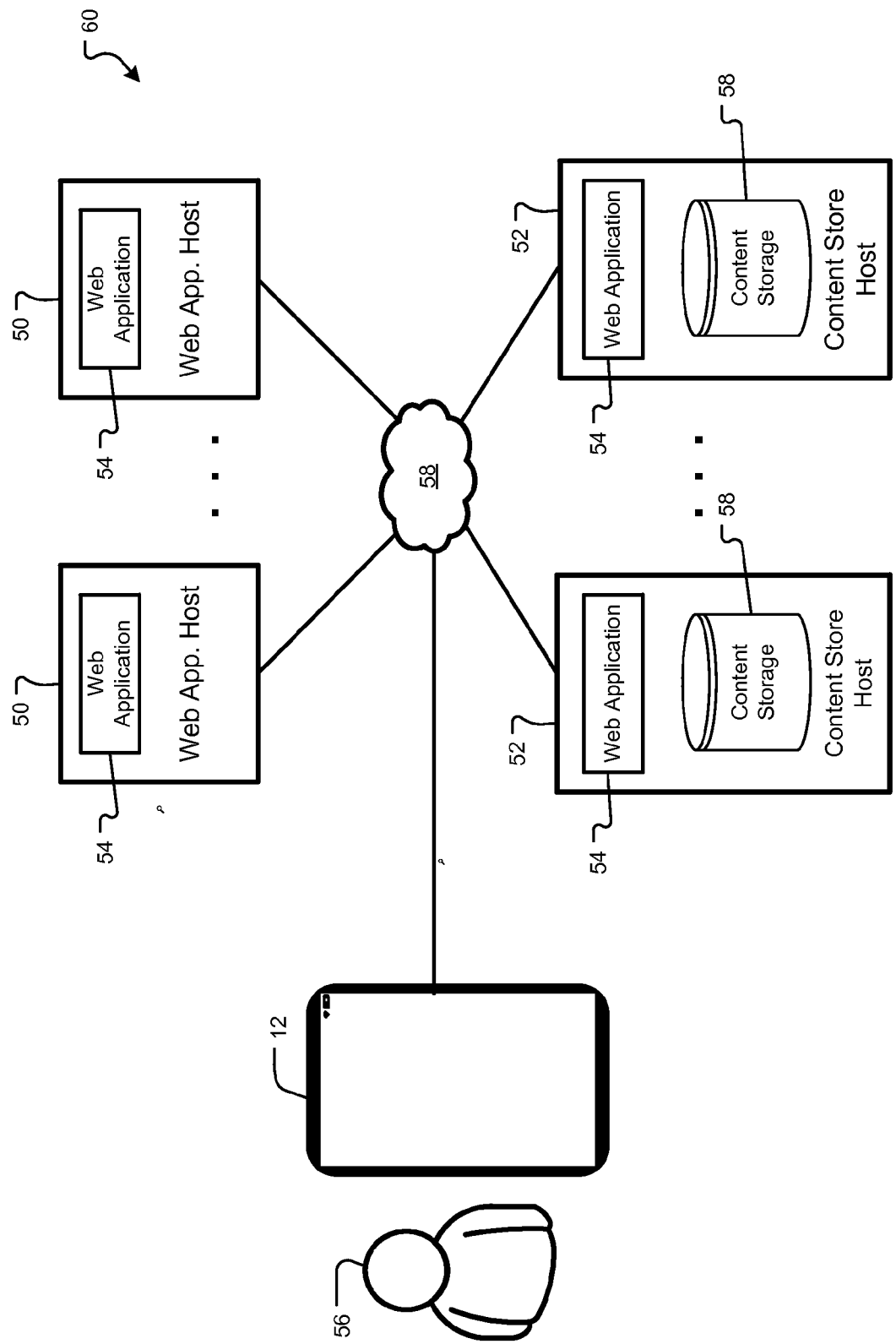
FIG. 2 is a diagram showing one embodiment of an environment for executing web applications at the computing device.

FIG. 2 is a diagram showing one embodiment of an environment 60 for executing web applications at the computing device 12. The environment 60 comprises the computing device 12 and a user 56 of the computing device 12. The user 56, for example, may be a human user. The computing device 12 may be in communication with one or more web application hosts 50, 52 via a network 58. The network 58 may comprise any suitable wired or wireless network components including, for example, a local area network (LAN), a wide area network (WAN), a cellular or other mobile data network, the Internet, etc. Web application hosts 50, 52 may comprise servers or other network locations that comprise web applications 54. Each web application 54 may comprise code to be executed by the device 12 (e.g., in the web view 8). The code may be according to any suitable language or syntax including, for example, Hyper Text Markup Language (HTML) of any suitable specification, JavaScript, etc. Each host 50, 52 may be described by a location indicator (e.g., URL).

In some embodiments, as described herein, the location indicator of a web application 54 may be utilized to pass one or more input parameters to the host 50, 52 or the web application 54, as described herein. Input parameters may be derived by the web application interface process 14a, 14b (e.g., services 20a, 20b) as described herein and/or derived by the web view 8. Some web application hosts may also act as digital content store hosts 52. For example, digital content store hosts 52 may comprise content storage 58 for storing various digital works such as documents, publications, music, video content, or any other type of media accessible through the computing device 12. Web applications 54 associated with web store hosts 52 may execute at the computing devices 12 to allow the user 56 to browse and/or purchase digital works from the web hosts 52.

Figure 3:
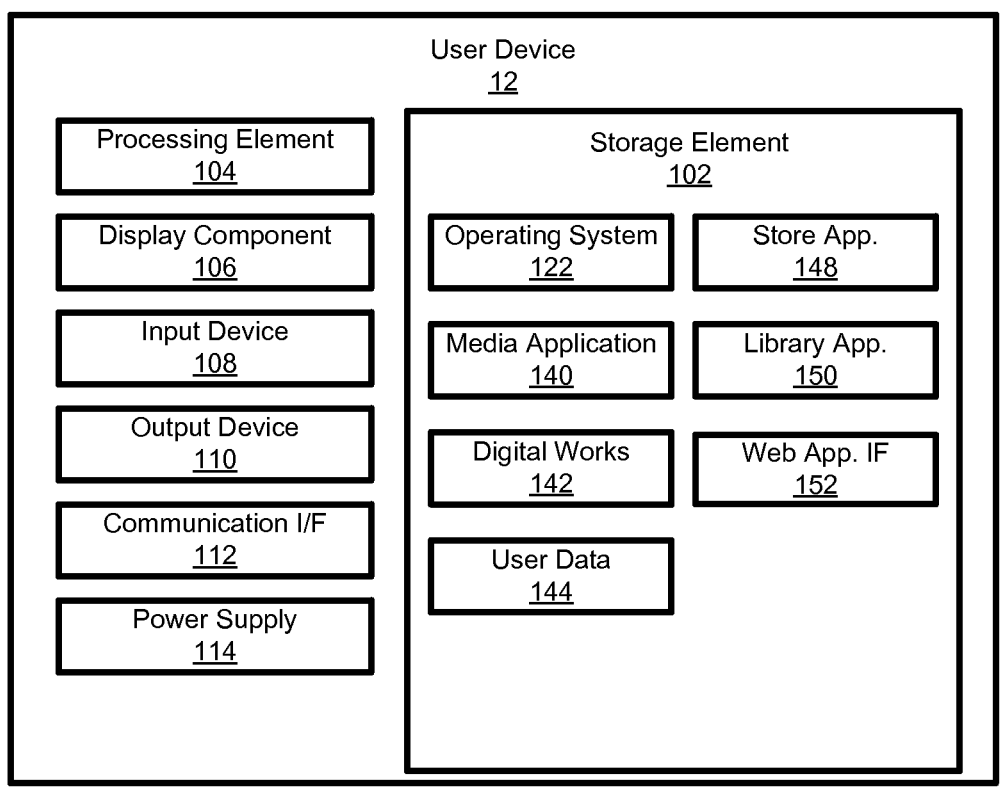
FIG. 3 is a block diagram showing additional details of an example computing device.

FIG. 3 is a block diagram showing additional details of an example computing device 12. The computing device 12 may include a display component 106. The display component 106 may comprise, for example, one or more devices such as cathode ray tubes (CRTs), liquid crystal display (LCD) screens, gas plasma-based flat panel displays, LCD projectors, or other types of display devices, etc. The computing device 12 may also include one or more input devices 108 operable to receive inputs from a user. The input devices 108 can include, for example, a push button, touch pad, touch screen, wheel, joystick, keyboard, mouse, trackball, keypad, accelerometer, light gun, game controller, or any other such device or element whereby a user can provide inputs to the computing device 12. These input devices 108 may be incorporated into the computing device 12 or operably coupled to the computing device 12 via wired or wireless interface. For computing devices with touch sensitive displays, the input devices 108 can include a touch sensor that operates in conjunction with the display component 106 to permit users to interact with the image displayed by the display component 106 using touch inputs (e.g., with a finger or stylus).

The computing device 12 may also include at least one communication interface 112, comprising one or more wireless components operable to communicate with one or more separate devices within a communication range of the particular wireless protocol. The wireless protocol can be any appropriate protocol used to enable devices to communicate wirelessly, such as Bluetooth, cellular, IEEE 802.11, or infrared communications protocols, such as an IrDA-compliant protocol. It should be understood that the computing device 12 may also include one or more wired communications interfaces for coupling and communicating with other devices. The computing device 12 may also include a power supply 114, such as a wired alternating current (AC) converter, a rechargeable battery operable to be recharged through conventional plug-in approaches, or through other approaches such as capacitive charging.

The computing device 12 also includes one or more processing elements 104 for executing instructions and retrieving data stored in a storage element 102. The storage element 102 can include one or more different types of memory, data storage or computer readable storage media devoted to different purposes within the computing device 12. For example, the storage element 102 may comprise flash memory, random access memory, disk-based storage, etc. Different portions of the storage element 102, for example, may be used for program instructions for execution by the processing element 104, storage of images or other digital works, and/or a removable storage for transferring data to other devices, etc.

Figure 5:
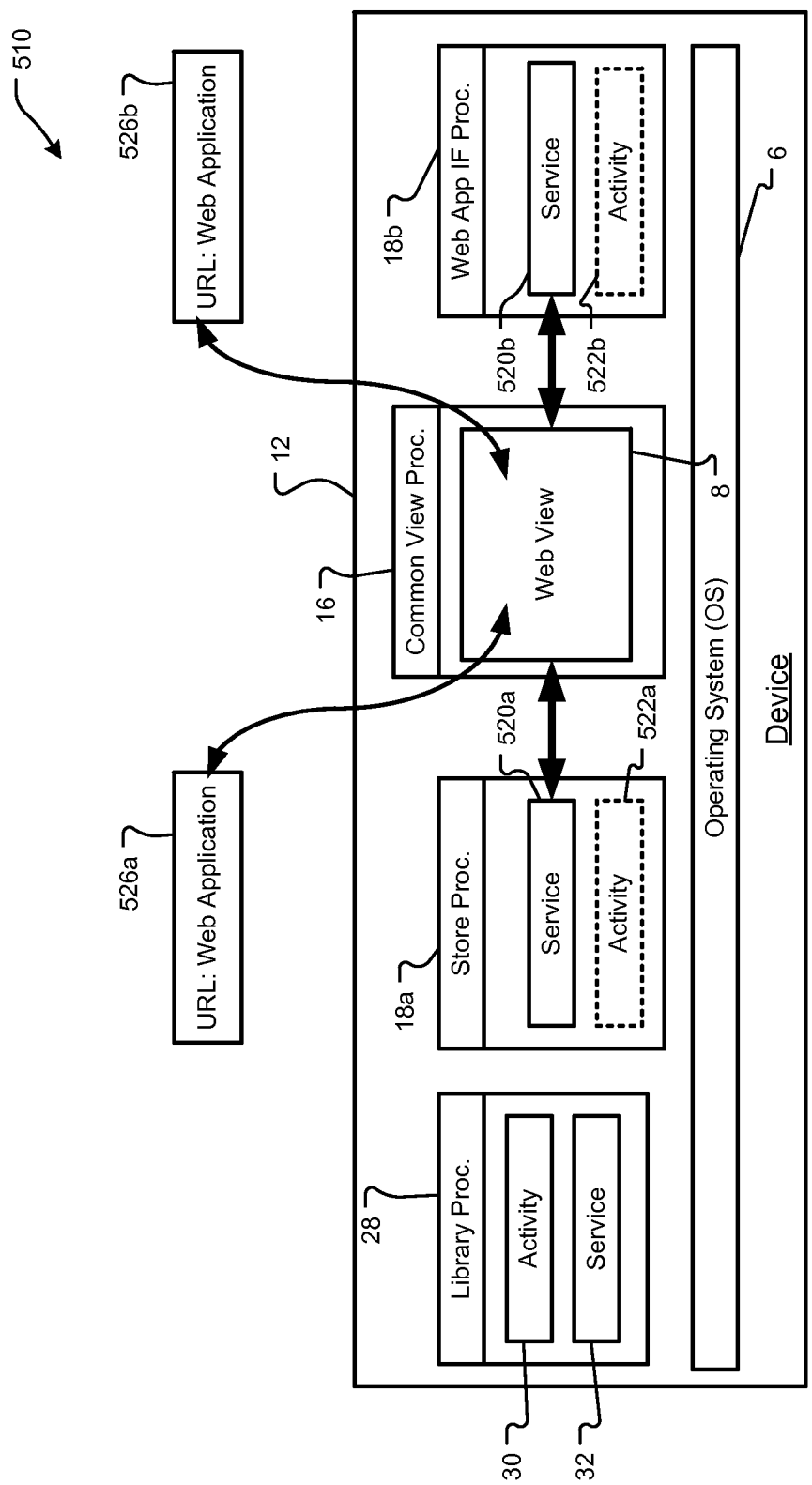
FIG. 5 is a diagram showing one embodiment of an environment including the computing device configured to utilize a common view process to execute one or more digital content stores.

The storage element 102 may store software for execution by the processing element 104, such as operating system 122. One or more web application interfaces 152 may comprise an executable file or files for implementing web application interface processes, such as 14a and 14b described herein. One or more store applications 148 and/or library applications 150 may comprise an executable file or files for implementing store processes 18a, 18b and library process 28a, 28b as described herein (FIG. 5). Additional optional software for execution by the processing element 104 may include one or more media applications 140 configured to present digital works 142 to the user 56, for example, via the display component 106 and/or output device 110 (e.g., speakers) of the computing device 12. The storage element 102 may also store data, such as files corresponding to one or more digital works 142, user data 144 describing the user 56 and/or the computing device 12, other device metrics, etc.

Figure 4:
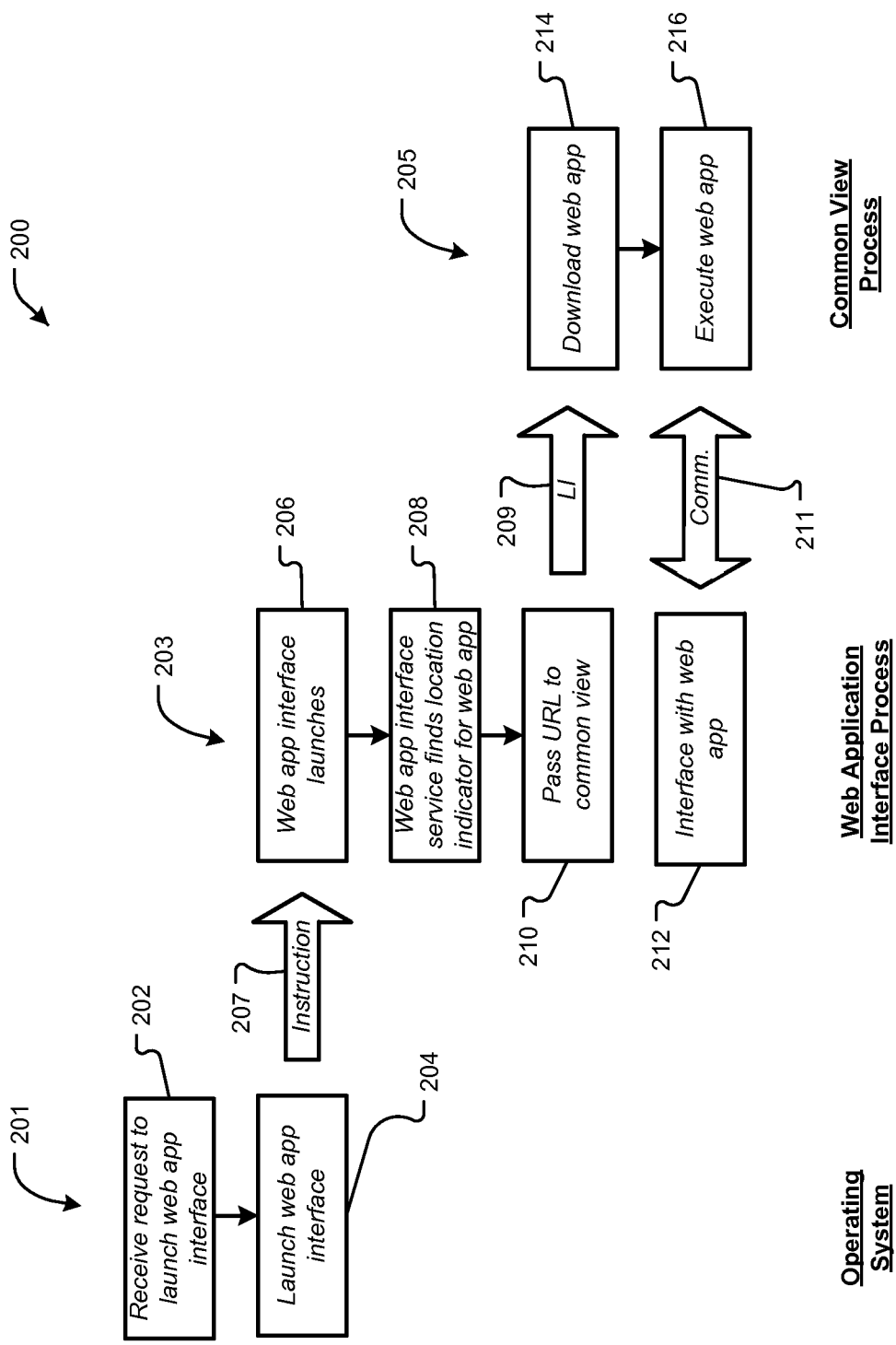
FIG. 4 is a flow chart showing one embodiment of a process flow for executing a web application utilizing the common view process.

FIG. 4 is a flow chart showing one embodiment of a process flow 200 for executing a web application utilizing the common view process 16. The process flow 200 comprises actions that may be performed by various processes and/or applications executing at the computing device 12. For example, column 201 includes actions that may be performed by the operating system 6. Column 203 includes actions that may be performed by a web application interface process 14. In some examples, the web application interface process 14 and service 20 described with respect to the process flow 200 may be any of the web application interface processes 14a, 14b and corresponding services 20a, 20b of FIG. 1. Column 205 includes actions that may be performed by the common view process 16. At 202, the operating system 6 may receive a request to launch a web application interface process 14. Launching the web application interface process 14 may comprise beginning execution of the web application interface process 14 when the process 14 is not currently executing. The request may be in any suitable form or format. For example, when the computing device 12 uses the FIRE OS or ANDROID operating system, the request may take the form of an intent directed to the operating system 6. In FIRE OS, ANDROID and similar operating systems, an intent is a data structure for describing an action to be performed. An intent may include a description of the action and, in some examples, an indication of data that is to be used to perform the action. An intent may or may not describe a system component to perform the indicated action (e.g., an activity such as activity 22). The intent may be transmitted to the operating system 6 which may respond to the intent. Responding to the intent may comprise causing the action to be performed including, for example, requesting that an identified system component perform the action, selecting a system component to perform the action, launching a system component to perform the action, etc. In response to the request, the operating system 6 may launch the web application interface process 14, for example, utilizing a launch instruction 207. The launch instruction 207 may include parameters and/or instructions for the web application interface process 14.

The web application interface process 14 may launch at 206. Upon launch, the web application interface process 14 (e.g., the service 20) may derive a location indicator for the web application 26. The location indicator may be a URL, as described herein. In some embodiments, the location indicator may also pass one or more input parameters to the web application. The web application interface process 14 (e.g., the service 20) may also determine input parameters and incorporate the input parameters into the location indicator. For example, input parameters may be based on user data 144 stored at the user device 12, input from the user 56, or any other suitable data. At 210, the web application interface process 14 (e.g., the service 20) may pass the location indicator 209 to the common view process 16. This communication may be accomplished in any suitable manner, as described herein.

The common view process 16 (e.g., the web view 8) may receive the location indicator 209 at 214. In response, the web view 8 may download code for executing the web application 26. The code may be downloaded from the appropriate web application host 50, 52 at the location indicated by the location identifier 209. The code may be in any suitable language or syntax, for example, as described herein. The web view 8 may execute the web application 26 at 216. In some examples, the web application 26 may be a hybrid application that accesses functionality provided by native processes of the computing device 12. For example, the web application 26 may transmit commands, function requests, or other communication 211 to the web application interface process 14. At 212, the web application interface process 14 may interface with the web application 26. The service 20 may receive communications from the web application 26, calculate responses to the communications and return responses. Communication between the web view 8 and the service 20 may be handled through the operating system 6 (e.g., utilizing intents).

In some examples, the web application may be a digital content store that allows the user 56 to purchase digital works that, for example, may be displayed or otherwise played back on the computing device 12. FIG. 5 is a diagram showing one embodiment of an environment 510 including the computing device 12 configured to utilize a common view process 16 to execute one or more digital content stores. As illustrated in FIG. 5, the device 12 executes a library process 28 and one or more store processes 18a, 18b in addition to the common view process 16. The store processes 18a, 18b may be web application interface processes similar to 14a, 14b that are configured to interface with respective digital content store web applications 526a, 526b for providing digital content stores. The store processes 18a, 18b may comprise respective services 520a, 520b and optional activities 522a, 522b similar to the services 20a, 20b and activities 22a, 22b described herein with respect to FIG. 1.

The library process 28 may be programmed to provide access to a library of digital works associated with the user 56. For example, the library may include digital works stored at the computing device 12 (e.g., digital works 142 stored at the storage element 102) and/or other digital works that the user 56 and/or computing device 12 is authorized to access from a remote location (e.g., a digital content store host 52). In some examples, the library may also comprise digital works for which the user can purchase playback rights. The library process 28 may comprise a service 32 and an activity 30. The activity 30 may provide a user interface comprising indicators of digital works included in the library, which may be referred to as digital work indicators. Each digital work indicator may be or comprise a visual element displayed through the user interface to correspond to one or more digital works. For example, a digital work indicator may be or comprise an icon, a button, or other selectable element. The user 56 may select a digital work indicator to access (e.g., initiate playback) of the digital work corresponding to the selected digital work indicator, as described herein. The service 32 may identify digital works that make up the library. In some examples the service 32 may scan the storage element 102 of the computer device 12 to identify digital works stored thereon. The service 32 may also be in communication with one or more outside sources (e.g., content store hosts 52) to identify digital works, if any, for which the user has playback rights or could potentially obtain playback rights. In some examples, the service 32 may also act in response to the user's selection of a digital work indicator from the interface. This may include, for example, launching a media application 140 to playback the digital work, requesting that the digital work be streamed to the user device 12, etc. If the user 56 does not possess rights to playback the selected digital work the service 32 may request a web application for providing a digital content store where playback rights may be purchased.

Figure 6:
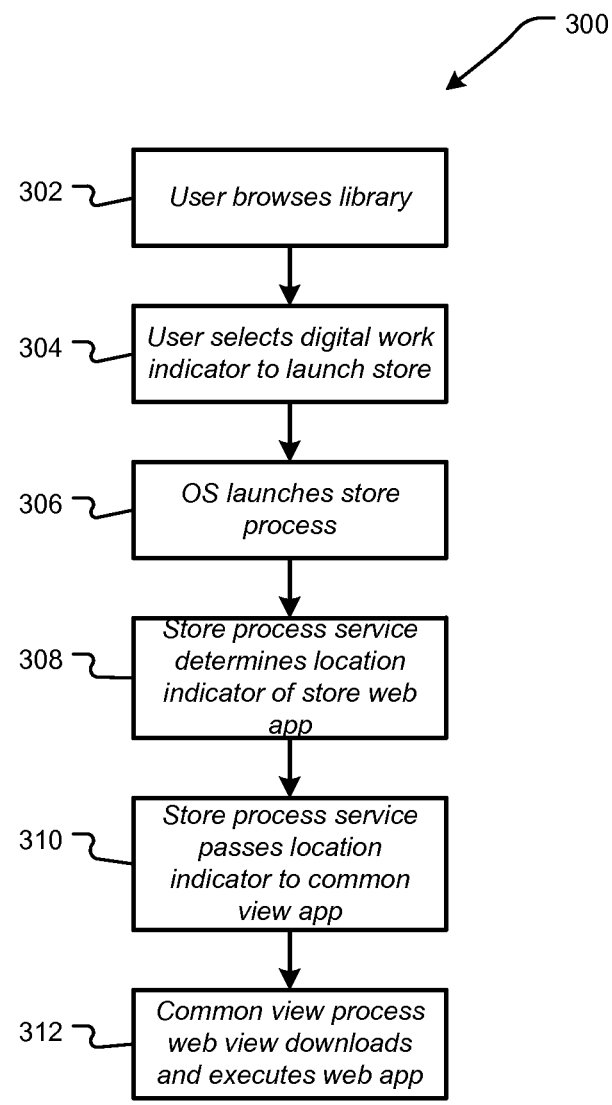
FIG. 6 is a flow chart showing one embodiment of a process flow for implementing a digital content store with a web application utilizing the common view process.

FIG. 6 is a flow chart showing one embodiment of a process flow 300 for implementing a digital content store with a web application 526 utilizing the common view process 16. For example, the process flow 300 may be executed in the environment 510 described herein using a store process 18 (e.g., one of store processes 18a, 18b). At 302, the user 56 may browse the library of digital works (e.g., the user interface generated by the activity 30). For example, the user 56 may view a user interface provided by the activity 30 of the library process 28. The library may comprise digital work indicators corresponding to digital works that may be played back on the user device 12 (e.g., digital works for which the user 56 and/or device 12 has obtained playback rights). These may include digital works present at the user device 12 and digital works that the user 56 is authorized to stream or otherwise download from another location. In some examples, the user interface provided by the activity 30 may also comprise one or more digital work indicators corresponding to digital works that are available for purchase through one or more digital content stores. For example, digital works available for purchase may include digital works for which the user 56 does not have playback rights. At 304, the user 56 may select a digital work indicator corresponding to a digital work available for purchase through a digital content store. For example, the user 56 may select the digital work indicator by selecting an associated button, switch, or any other suitable mechanism provided by the user interface. In some examples, the user interface provided by the activity 30 may include selectable digital work indicators for digital works for which the user 56 and/or device 12 already possesses playback rights. Accordingly, when a digital work indicator is selected, the library process 28 (e.g., the service 32) may determine whether the selected digital work indicator corresponds to a digital work to which the user 56 and/or computing device 12 possesses playback rights. If so, the library process 28 may initiate playback, for example, by launching a media application 140 (FIG. 3). If not, the library process 28 may launch a digital content store to provide the user 56 with an opportunity to obtain playback rights.

When the user 56 selects a digital work indicator that results in launching of a digital content store, the operating system 6 may launch the store process 18 corresponding to the selected store. For example, when the computing device 12 uses the FIRE OS or ANDROID operating system, the service 32 of the library process 28 may generate an intent directed towards the operating system 6. The intent may indicate the requested store. In response to the intent, the operating system 6 may launch the store process 18.

When the store process 18 is launched, its service 520 may, at 308, determine a location indicator for a web application 526 associated with the store. As described herein, the location indicator may indicate a network location of the web application 526 as well as input parameters. In some examples, the input parameters may be derived from the user data 144 stored at the computing device 12, the circumstances surrounding the user's request to access the store through the library process 28, a number and/or type of digital works already in the user's library, etc. At 310, the service 520 passes the derived location indicator to the web view 8 of the common view process 16. The location indicator may be passed in any suitable manner. For example, the service 520 may direct an intent including the location indicator to the operating system 6. The operating system 6 may direct the location indicator to the common view process 16 and the web view 8. Also, in some examples, the web view 8 and the service 520 may be bound. In this way, the service 520 may pass the location indicator to the web view 8 via the operating system 6 while the operating system 6 increases the likelihood that the web view 8 is active to receive it. At 314, upon receiving the location indicator, the web view 8 may download and execute the web application 526 for implementing the store. The web application 526 may communicate with the store process 18, as described herein. In various examples, the web application 526 may implement a digital content store. For example, the web application 526 may be configured to receive payment for playback rights to digital works, stream digital works to the computing device 12, etc.

As described herein, the service 20, 520 communicates with the web view 8 at various points during the launch and execution of the web application 26, 526. When the service 20, 520 and the web view 8 are part of the same process, this communication may be accomplished by using a communications bridge. In examples where the process is written utilizing the JAVA language and the web application is executed utilizing the JavaScript language, the communications bridge may be a JavaScript→Java bridge. When the service 20, 520 and web view 8 are contained in different processes, however, (as illustrated in FIGS. 1 and 5) the operating system 6 may not support a JavaScript→Java bridge or other direct communications bridge. Instead alternative means of communication between the service 20, 520 and web view 8 may be used.

Figure 7:
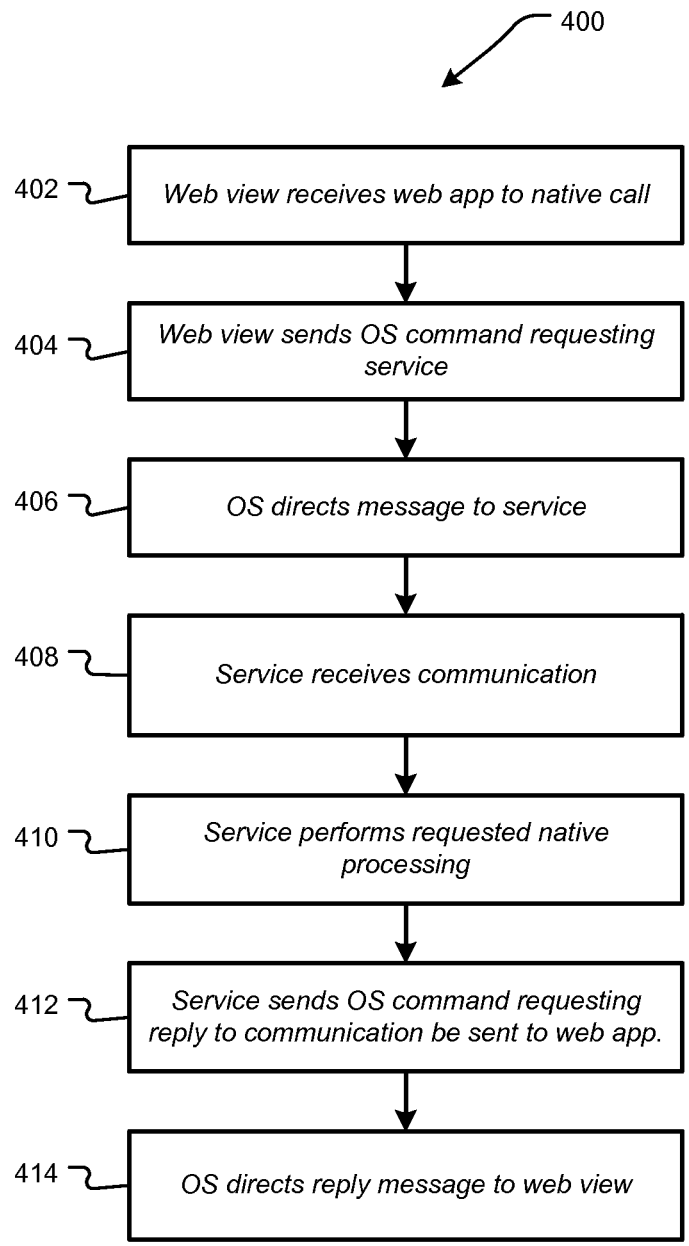
FIG. 7 is a flow chart showing one embodiment of a process flow demonstrating an example communication between the service and the web view in an environment, such as those of FIGS. 1 and 5, where the service and web view are in distinct processes.

FIG. 7 is a flow chart showing one embodiment of a process flow 400 demonstrating an example communication between a service, such as services 20, 520 and a web view, such as web view 8 in an environment, such as 10 and 510, where the service and web view are in distinct processes. The process flow 400 utilizes calls to the operating system to facilitate communications between the components 20, 520, 8. For example, at 402, the web view may receive a message from a web application, such as 26, 526, to a native component, such as the service. A call may be a message directed to a particular system component (e.g., a web application, a service, etc.) For example, a call may include request that the recipient perform a specific task. Also, for example, a call may include the results of a specific task performed by the originator of the call (e.g., in response to a request from the recipient of the call).

The web application may be executed at a web application interface process, such as 14 or 18, that previously downloaded the web application as described herein (FIGS. 1, 5). The call from the web application may comprise, for example, a request to access native functionality at the service, a response to a request from the service to perform any suitable processing, etc. At 404, the web view may send an operating system command to the operating system including the call from the web application. For example, when the computing device 12 uses the FIRE OS or ANDROID operating system, the operating system command may be an intent. The operating system command may identify the service and/or the web application interface process including the service. Additionally, the operating system command may include and/or describe the call received from the web application. At 406, the operating system may direct a message to the appropriate web application interface process and/or the service thereof. The message may comprise the call from the web application.

The service may receive the operating system message at 408. When the service is bound to the web view, the operating system may manage execution of the service to make it more likely that the service is active when the message is sent at 406. For example, the service may be prioritized over other processes and objects of the computing device. In this way the service is more likely to be already active when the message is sent. At 410, the service may perform native processing requested by the web application. When the service completes its processing, it may direct a second command to the operating system. The second operating system command may comprise an identification of the web application and/or the web view as well as a request to direct a reply communication to the web application. The reply communication may comprise, for example, a response to the original communication from the web application, a call to the web application to perform a function or other processing, etc. The operating system may receive the command, including the reply communication, and direct the reply communication to the web view at 414. The web view may provide the reply communication to the web application. In some examples, the call from the web application to the service may not include a request for service to perform processing (e.g., the call may return a result requested by the service 20). When this is the case, 410, 412 and 414 may be omitted.

In some examples, facilitating communications between objects in distinct processes may introduce security and operational concerns. For example, ANDROID, FIRE OS and similar operating systems maintain separation between processes to reduce security and operational risks that may arise when one process is able to directly communicate with another. Security concerns, however, may be addressed in various different ways. For example, in some examples, such as some where the common web view 8 is used to execute digital content store applications 526, the common view process 16 and the web application interface processes 14, 18 utilizing it may be implemented by the same party. For example, operating system 6, web application interface processes 14, 18 and/or common view process 16 may be configured to refuse bound service connections with other processes that are not from the same party. For example, processes 14, 16, 18 may look for a digital certificate or other identifying feature of an application requesting a bound service connection before accepting the request. For operational concerns, the party implementing a web application interface process 14, 18 or a common view process 16 may model interactions between the developed process and other processes in the computing device 12 and correct for potential errors at the development time. Also, in some examples, the messages between bound objects may be encrypted either by the objects themselves or as an encrypted or otherwise secure channel. This may minimize the risk that communications between bound object will be intercepted and used by malicious actors or software.

Figure 8:
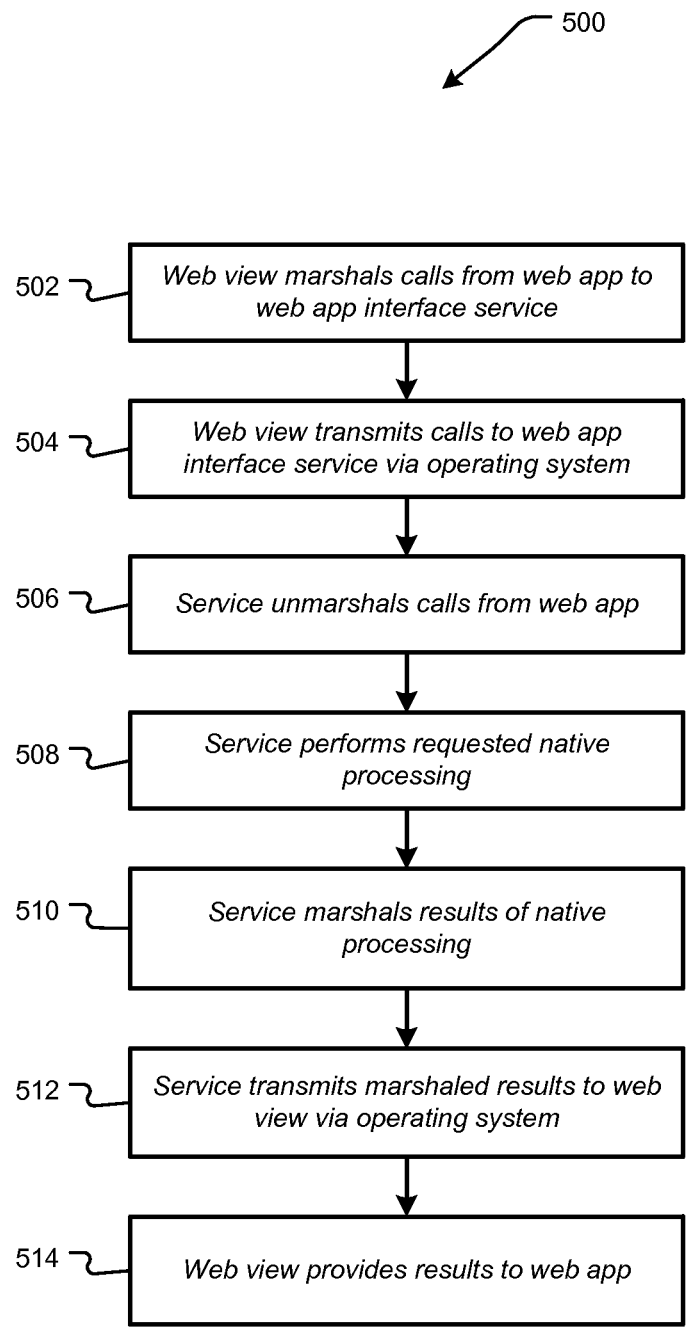
FIG. 8 is a flow chart showing one embodiment of a process flow demonstrating an example communication between an example service and web view where communications are marshaled.

In some examples, any of the environments described herein may be configured to marshal communications between the web view 8 and the various services 20, 520. This may tend to conserve the resources and increase the execution speed of the computing device 12. FIG. 8 is a flow chart showing one embodiment of a process flow 500 demonstrating an example communication between an example service and web view where communications are marshaled. The service may be bound to the web view or unbound, for example, as described herein. The process flow

500 may describe interactions between one of the services 20, 520 and the web view 8 described herein. The web view may receive one or more calls from a web application (e.g., 26, 526) executing through web view. For example, the calls originating from the web application may be organized according to an interpreted language syntax utilized by the web application. Example interpreted languages include JavaScript, Python, Perl, HTML, etc. The calls may be directed to the service. In some examples, the web application may be a JavaScript application and the service may be a Java object. Calls between components of this type may include one or more JavaScript to Java calls. For example, the calls may specify a Java method or function to be executed by the service.

At 502, the web view may marshal the one or more calls from the web application to the service. Marshaling may comprise changing the format of the calls for transmission to the service. For example, the syntax of the calls may be modified to a syntax understood by the service. After marshaling, the calls may be represented according to any suitable syntax including, for example, Extensible Markup Language (XML), JavaScript Object Notation (JSON), any form of interface definition language such as ANDROID IDL, APACHE THRIFT IDL, etc. In some embodiments, marshalling calls may also comprise removing code from the calls and replacing the removed code with a pointer or pointers to a commonly accessible location (e.g., at the computing device 12) where the removed code may be retrieved. Also, in some examples, multiple calls may be marshaled into a single message for transmission the service. The web view may determine the calls to be marshaled to a single message in any suitable manner. For example, the web view may marshal all calls received during a defined time interval.

At 504, the web view may transmit the marshaled calls to the service via the operating system (e.g., operating system 6). For example, the web view may transmit an intent or other suitable form of request to the operating system. The request may include the marshaled calls. The operating system may direct the request to the service for execution. At 506, the service may unmarshal the calls from the web application. For example, unmarshaling may include recognize the syntax of the calls and converting to a different syntax for processing by the service. The syntax for processing by the service may be the original syntax of the calls (e.g., JavaScript to Java) or a different syntax (e.g., XML, JSON an interface definition language, etc.) At 508, the service may perform the processing requested by the calls. For example, calls that are requests for the service to execute a native function may be processed by executing the requested native function. A native function, for example, may be able to access resources of the computing device 12 that are not directly available to the web application. Some calls may report the result of a web application function performed by the web application, for example, in response to a prior request from the service.

Some or all of the calls received from the web application may result in one or more reply communications to the web application (e.g., a result and/or a function call). At 510, the service may marshal the reply communications, for example, according to XML, JSON, IDL or another suitable syntax, as described above. At 512, the service may transmit the marshaled reply communications to the web view via the operating system in a manner similar to that described with respect to 504 above. The web view may unmarshal the marshaled reply communications and provide them to the web application at 514.

Figure 9:
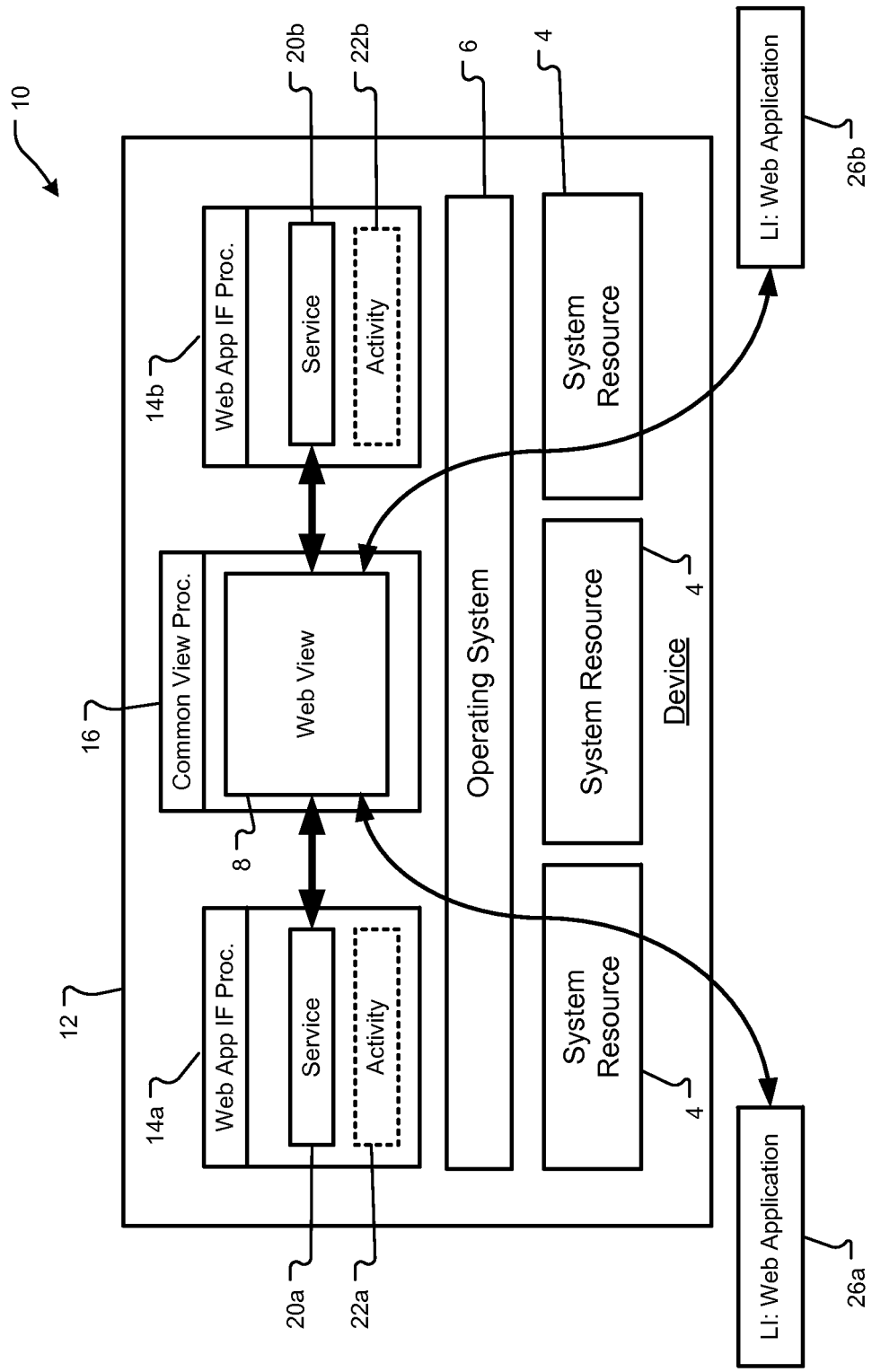
FIG. 9 is a diagram showing one embodiment of the environment of FIG. 1 showing additional details.

FIG. 9 is a diagram showing one embodiment of the environment 10 showing additional details. The operating system 6 may serve as an interface between the various processes 14, 16 and also as an interface between the various processes 14, 16 and other system resources 4. The system resources 4 may comprise, for example, the processing element 102, display component 106, input device 108, output device 110, communication interface 112, etc. (FIG. 3). For example, the web view 8 may communicate with web application hosts 50, 52 to download web applications 26, 526 by utilizing the communications interface 112 or other suitable system resource 4. The web view 8 may request access to an appropriate system resource 4 though the operating system 6. The operating system 6 may put the web view 8 in direct communication with the requested resource 4 and/or may act as an intermediary by passing instructions from the web view 8 to the resource 4.

Figure 10:
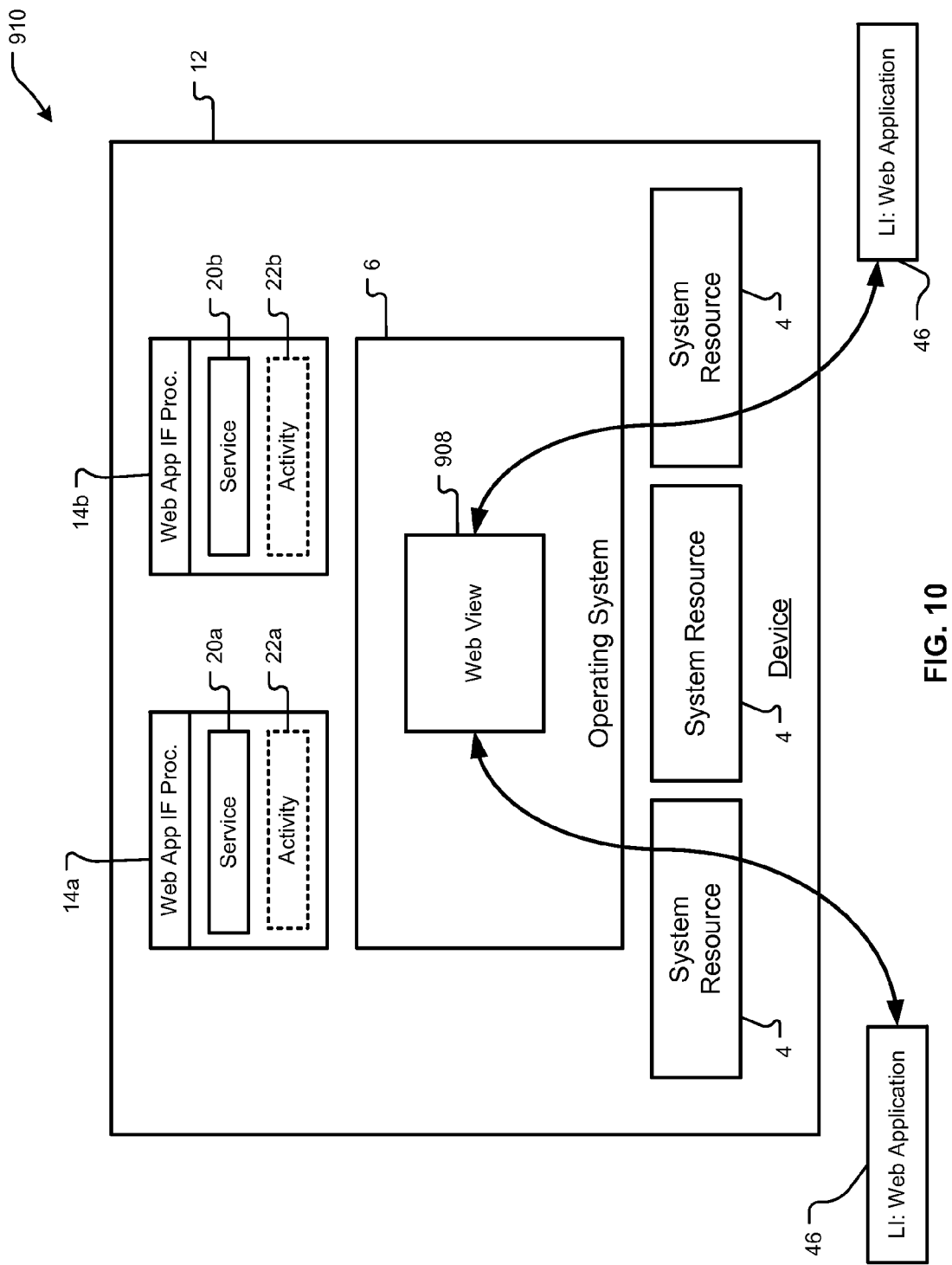
FIG. 10 is a diagram showing another embodiment of the environment of FIG. 1 where the web view is executed as an operating system service.

FIG. 10 is a diagram showing another embodiment of the environment 910 where the web view 908 is executed as an operating system service. For example, the environment 910 may omit the common view process 16. Instead, the operating system 6 may execute a common web view 908. For example, the common web view 908 may be offered as a service of the operating system 6. When a web application interface process 14 is launched, it may communicate with the common web view 908 in a manner similar to that described herein with respect to the web view 8. Because the common web view 908 is executed by the operating system 6 instead of a separate process, the processes 14 may communicate with the common web view 908 by directing messages to the operating system 6.

Although various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and, consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer readable medium for use by or in connection with an instruction execution system such as a processing component in a computer system. In this sense, the logic may comprise, for example, statements including instructions and declarations that can be fetched from the computer readable medium and executed by the instruction execution system. In the context of the present disclosure, a "computer readable medium" can be any medium that can contain, store, or maintain the logic or application described herein for use by or in connection with the instruction execution system. The computer readable medium can comprise any one of many physical media such as magnetic, optical, or semiconductor media. More specific examples of a suitable computer readable media include, but are not limited to, magnetic tapes, magnetic floppy diskettes, magnetic hard drives, memory cards, solid-state drives, USB flash drives, or optical discs. Also, the computer readable medium may be a random access memory (RAM) including, for example, static random access memory (SRAM) and dynamic random access memory (DRAM), or magnetic random access memory (MRAM). In addition, the computer readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

What is claimed is:

1. A computer-implemented method for executing web applications, the method comprising:
   executing, by at least one processor, a library process, wherein the library process causes provision of a user interface comprising a digital work indicator;
   executing, by the at least one processor, a common view process, wherein the common view process comprises a web view that is enabled to download and execute web applications;
   in response to a selection of the digital work indicator from the user interface, sending, by the library process, an intent requesting initiation of a digital content store, wherein the intent describes the initiation of the digital content store and describes the digital content store;
   launching, by the at least one processor and in response to the intent, a digital content store process for the digital content store, wherein the digital content store process comprises a service programmed to:
      determine a Uniform Resource Locator (URL) describing an Internet Protocol (IP) address of code for executing a digital content store web application;
      select at least one input parameter for the digital content store web application;
      incorporate the at least one input parameter and the URL into a location indicator for the digital content store web application; and
      send the location indicator for the digital content store web application to the common view process;
   downloading, by the web view of the common view process, the code for executing the digital content store web application; and
   executing, by the web view of the common view process, the digital content store web application.

2. The method of claim 1, further comprising:
   in response to a selection of a second digital work indicator from the user interface, sending, by the library process, a second intent requesting initiation of a second digital content store;
   launching, by the at least one processor, a second digital content store process for the second digital content store, wherein the second digital content store process comprises a second service programmed to:
      determine a URL describing an IP address of second code for executing a second digital content store web application;
      select at least one input parameter for the second digital content store web application;
      incorporate the at least one input parameter and the URL into a location indicator for the second digital content store web application; and
      send the location indicator for the second digital content store web application to the common view process;
   downloading, by the web view of the common view process, the second code for executing the second digital content store web application; and
   executing, by the web view of the common view process, the second digital content store web application.

3. The method of claim 2, wherein the executing the digital content store web application and the executing the second digital content store web application are performed sequentially, and wherein the method further comprises:
   deactivating the digital content store web application; and
   after deactivating the digital content store web application, activating the second digital content store web application.

4. The method of claim 1, further comprising:
   binding the web view and the service;
   receiving a call from the digital content store web application to the service;
   generating from the call a marshaled call;
   sending the marshaled call to the digital content store process;
   generating the call from the marshaled call by the service;
   executing, by the service, a native function requested by the call.

5. A computer-implemented system for executing web applications, the system comprising:
   at least one processor; and
   a non-transitory computer readable medium coupled with the at least one processor, wherein the non-transitory computer readable medium comprises thereon instructions that, when executed by the at least one processor, cause the at least one processor to:
      execute a common view process comprising a web view;
      receive a request to execute a web application;
      execute a web application interface process programmed to:
         determine a location indicator indicating a location of code for executing the web application; and
         send the location indicator to the common view process;

receive, by the web view of the common view process, the code for executing the web application; and execute, by the web view of the common view process, the web application.

6. The system of claim 5, wherein the common view process is executing before the web application interface process is launched.

7. The system of claim 5, wherein the non-transitory computer readable medium further comprises instructions that, when executed by the at least one processor, cause the at least one processor to:

receive a request to launch a second web application;

execute a second web application interface process programmed to:

determine a second location indicator indicating a location of code for executing the second web application;

send the second location indicator to the common view process;

receive, by the web view of the common view process, the code for executing the second web application; and execute by the web view of the common view process, the second web application.

8. The system of claim 5, wherein the non-transitory computer readable medium further comprises instructions that, when executed by the at least one processor, cause the at least one processor to bind the web view to the web application interface process.

9. The system of claim 8, wherein the non-transitory computer readable medium further comprises instructions that, when executed by the at least one processor, cause the at least one processor to:

receive a call from the web application to the web application interface process;

generate from the call a marshaled call;

send the marshaled call to the web application interface process;

generate the call from the marshaled call by the web application interface process;

execute, by the web application interface process, a native function requested by the call.

10. The system of claim 9, wherein the plurality of calls received from the web application are organized according to an interpreted language.

11. The system of claim 5, wherein the non-transitory computer readable medium further comprises instructions that, when executed by the at least one processor, cause the at least one processor to:

receive, by the web view, a call from the web application;

send, by the web view, the call to an operating system executed by the at least one processor;

send, by the operating system, the call to the web application interface process.

12. The system of claim 5, wherein the non-transitory computer readable medium further comprises instructions that, when executed by the at least one processor, cause the at least one processor to execute, by the web application interface process, a native function indicated by the call.

13. The system of claim 5, wherein the request to launch the web application comprises at least one input parameter for the web application and wherein determining the location indicator comprises incorporating the at least one input parameter into the location indicator.

14. The system of claim 5, wherein the web application is a digital content store web application programmed to provide digital works to the at least one processor.

15. The system of claim 5, wherein the common view process is a component of an operating system executed by the at least one processor.

16. A computer-implemented method for executing web applications, the system comprising:

executing, by at least one processor, a common view process comprising a web view;

receiving, by the at least one processor, a request to execute a web application;

executing, by the at least one processor, a web application interface process programmed to:

determine a location indicator indicating a location of code for executing the web application; and send the location indicator to the common view process;

receive, by the web view of the common view process, the code for executing the web application; and execute, by the web view of the common view process, the web application.

17. The method of claim 16, further comprising:

receiving, by the at least one processor, a request to launch a second web application;

executing, by the at least one processor, a second web application interface process programmed to:

determine a second location indicator indicating a location of code for executing the second web application;

send the second location indicator to the common view process;

receiving, by the web view of the common view process, the code for executing the second web application; and executing by the web view of the common view process, the second web application.

18. The method of claim 16, further comprising binding the web view to the web application interface process.

19. The method of claim 18, further comprising:

receiving a call from the web application to the web application interface process;

generating from the call a marshaled call;

sending the marshaled call to the web application interface process;

generating, by the web application interface process, the call from the marshaled call;

executing, by the web application interface process, a native function requested by the call.

20. The method of claim 16, further comprising executing, by the web application interface process, a native function indicated by the call.

* * * * *